US007239866B2

(12) United States Patent
Cai et al.

(10) Patent No.: US 7,239,866 B2
(45) Date of Patent: Jul. 3, 2007

(54) SPAM CHECKING FOR INTERNETWORK MESSAGES

(75) Inventors: Yigang Cai, Naperville, IL (US); Shehryar S. Qutub, Hoffman Estates, IL (US); Gyan Shanker, Naperville, IL (US); Alok Sharma, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 128 days.

(21) Appl. No.: 11/018,908

(22) Filed: Dec. 21, 2004

(65) Prior Publication Data
US 2006/0135133 A1    Jun. 22, 2006

(51) Int. Cl.
*H04M 3/42*    (2006.01)
(52) U.S. Cl. .................. 455/414.1; 455/422.1
(58) Field of Classification Search ............... 455/466, 455/414.1, 445, 412.1, 422.1; 358/1.15; 709/206, 207; 705/10
See application file for complete search history.

(56) References Cited

U.S. PATENT DOCUMENTS

2003/0083078 A1*  5/2003  Allison et al. .............. 455/466
2004/0167968 A1*  8/2004  Wilson et al. .............. 709/207
2005/0101306 A1*  5/2005  Zabawskyj et al. ....... 455/414.1
2005/0101337 A1*  5/2005  Wilson et al. .............. 455/466
2005/0176433 A1*  8/2005  Wilson ........................ 455/445

FOREIGN PATENT DOCUMENTS

WO    WO 03/049461 A2    6/2003
WO    WO 2005/091656 A1    9/2005

* cited by examiner

*Primary Examiner*—Naghmeh Mehrpour

(57) ABSTRACT

This invention relates to a method and apparatus for blocking spam messages originated in a different network. An anti-spam check is made in response to an initial Send Routing Information (SRI) message received in a destination network of a message. The result of this check is sent back to the originating network along with a destination address of a switch in the destination network, and SRI spam code and Mobile Terminated (MT) Routing Address Correlation ID. If SRI spam code indicates a spam, then subsequent transmission of the MT message with the same Correlation ID is blocked in the interworking switch or SMSC.

8 Claims, 2 Drawing Sheets

SPAM CHECKING FOR INTERNETWORK MESSAGES

RELATED APPLICATION(S)

Figure 1:
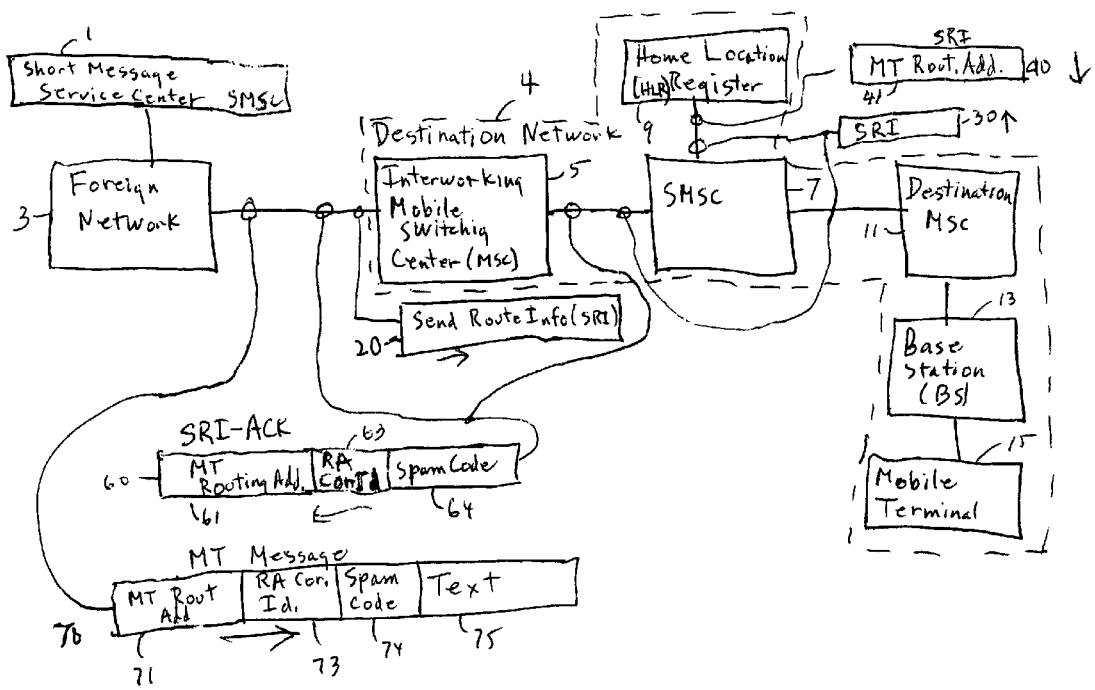

This application is related to the applications of:

Yigang Cai, Shehryar S. Qutub, and Alok Sharma entitled "Storing Anti-Spam Black Lists";

Yigang Cai, Shehryar S. Qutub, and Alok Sharma entitled "Anti-Spam Server";

Yigang Cai, Shehryar S. Qutub, and Alok Sharma entitled "Detection Of Unwanted Messages (Spam)";

Yigang Cai, Shehryar S. Qutub, and Alok Sharma entitled "Unwanted Message (Spam) Detection Based On Message Content";

Yigang Cai, Shehryar S. Qutub, and Alok Sharma entitled "Spam White List"; and

Yigang Cai, Shehryar S. Qutub, and Alok Sharma entitled "Anti-Spam Service";

which applications are assigned to the assignee of the present application and are being filed on an even date herewith.

TECHNICAL FIELD

This invention relates to the detection of spam messages in calls between different networks.

BACKGROUND OF THE INVENTION

With the advent of the Internet, it has become easy to send messages to a large number of destinations at little or no cost to the sender. The messages include the short messages of short message service. These messages include unsolicited and unwanted messages (spam) which are a nuisance to the receiver of the message who has to clear the message and determine whether it is of any importance. Further, they are a nuisance to the carrier of the telecommunications network used for transmitting the message, not only because they present a customer relations problem with respect to irate customers who are flooded with spam, but also because these messages, for which there is usually little or no revenue, use network resources. An illustration of the seriousness of this problem is given by the following two statistics. In China in 2003, two trillion short message service (SMS) messages were sent over the Chinese telecommunications network; of these messages, an estimated three quarters were spam messages. The second statistics is that in the United States an estimated 85–90% of e-mail messages are spam.

A number of arrangements have been proposed and many implemented for cutting down on the number of delivered spam messages. Various arrangements have been proposed for analyzing messages prior to delivering them. According to one arrangement, if the calling party is not one of a pre-selected group specified by the called party, the message is blocked. Spam messages can also be intercepted by permitting a called party to specify that no messages destined for more than N destinations are to be delivered.

A called party can refuse to publicize his/her telephone number or e-mail address. In addition to the obvious disadvantages of not allowing callers to look up the telephone number or e-mail address of the called party, such arrangements are likely to be ineffective. An unlisted e-mail address can be detected by a sophisticated hacker from the IP network, for example, by monitoring message headers at a router. An unlisted called number simply invites the caller to send messages to all 10,000 telephone numbers of an office code; as mentioned above, this is very easy with present arrangements for sending messages to a plurality of destinations.

Special spam detection problems occur in calls between different, referred to in the industry as foreign, networks, i.e., calls between networks served by different carriers. Such calls are very frequent since there are at least two giant cellular carriers in the United States—Cingular and Verizon. This necessitates having to go between different networks for a large portion of the traffic. This complicates the spam detection problem because each network has access only to its own database.

The prevalence of spam from foreign networks can also be indicated by the estimate of Chinese engineers that in China 80–90% of spam messages for short message service are sent from foreign networks. Thus, control of spam messages from foreign networks is a major objective of a good spam control system.

SUMMARY OF THE INVENTION

Applicants have analyzed this problem carefully. In accordance with the prior art when a call crosses network boundaries, the switch in the foreign network sends a Send Routing Info (SRI) message to the home network switch that forwards SRI message to the home Short Message Service Center (SMSC). The home SMSC queries an HLR (Home Location Register) to verify the destination terminal location. The HLR returns the routing information back to the SMSC in the SRI Acknowledgement messages. The SMSC can distinguish whether the original SRI represents spam after it receives the SRI Acknowledgement messages if the SMSC is equipped with anti-spam capability. If the SRI is good, the SMSC returns the Acknowledgement messages back to the interworking switch which returns the acknowledgement to the foreign network. The switch in the foreign network then sends Mobile Terminated (MT) messages with the received routing address from SRI Acknowledgement to the destination SMSC which forwards the SMS to the destination terminal (end user). If the SRI is bad, the home SMSC with anti-spam capability will delete the spam SRI message and send an error message to the foreign network, or return an SRI Acknowledgement message that has no indication of spam SRI as in the to prior art. However, in either case, according to the prior art, the foreign network will continue to send an MT message to the destination network. The problem is that there is no correlation between the previous SRI message and the later MT message. The home SMSC must re-analyze the later MT message independently to check if it is for a spam message.

Applicants have solved this problem and made a contribution over the teachings of the prior art in accordance with this invention wherein an anti-spam check is made in the destination network in response to the initial SMS Send Routing Info (SRI) message; the SRI acknowledge message returned to the foreign network contains an SRI spam code and a RA (Routing Address) Correlation ID.

The foreign network switch can block the MT message according to the SRI spam result. Alternatively, if the MT message is not blocked in the foreign network but forwarded to the home SMSC, the SMSC will detect it based on correlation ID. The SMSC will determine whether to block the MT message without a spam check or further check the MT message to decide if needs to forward the message to the destination. For certain spam SRI codes, it may be desirable to transmit a message for further analysis in the home network.

BRIEF DESCRIPTION OF THE DRAWING(S)

Figure 2:
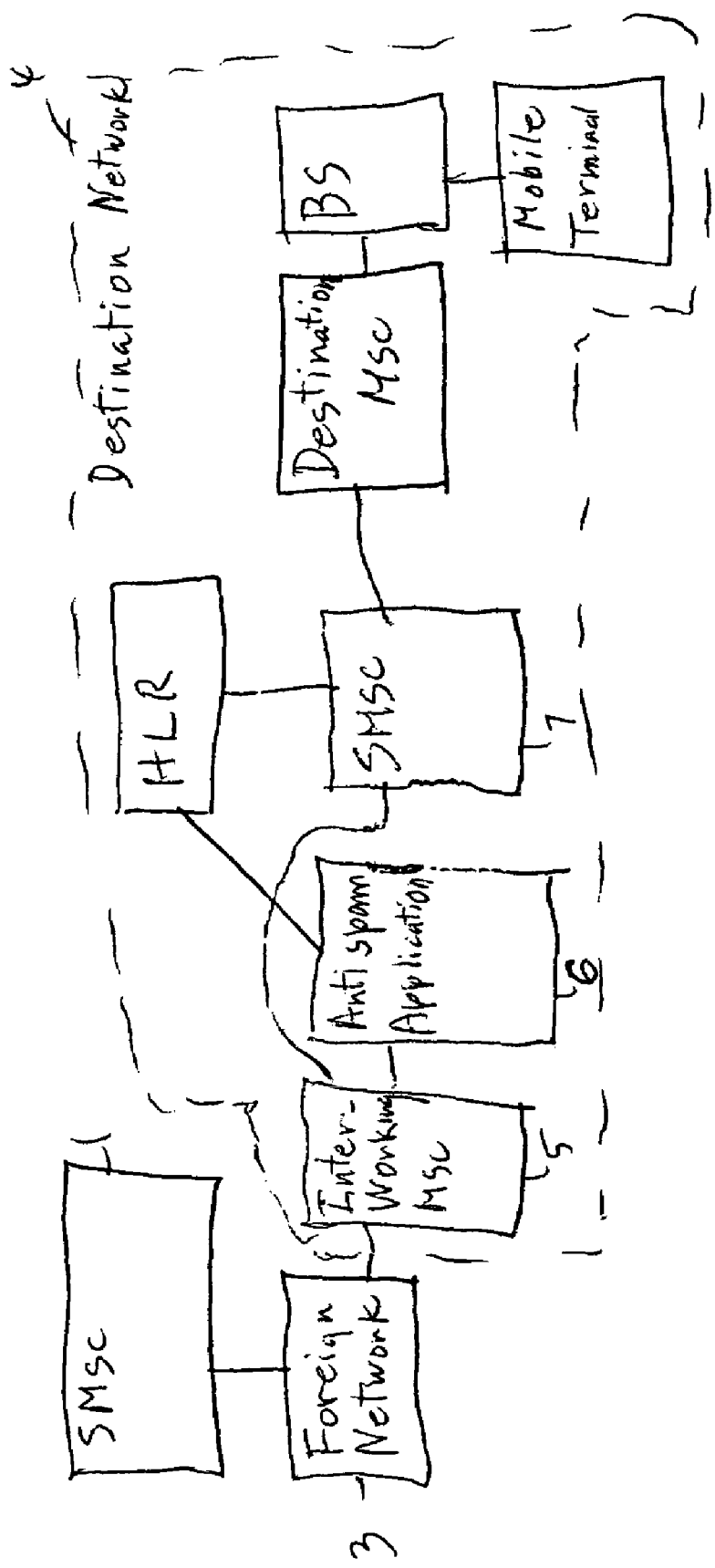

FIG. 1 is a block diagram illustrating the operation of Applicants' invention; and FIG. 2 is a block diagram illustrating an alternate configuration of Applicants' invention.

DETAILED DESCRIPTION

FIG. 1 illustrates the operation of Applicants' invention. An SMSC connected to a foreign originating network 3 sends a SMS message destined for network 4, the home network of the destination telecommunications station 15. Before the switch in the foreign network forwards the SMS message to the destination, it will first send a Send Routing Info message 20 to the destination network. The message 20 is an SRI message (an SMS send routing info message) requesting information for routing the call to the destination terminal. The SRI message is received in network 4 in an interworking mobile switching center 5, a mobile switching center arranged to interface with the foreign network. The interworking MSC 5 passes the message on to a destination SMS center (SMSC) 7, which sends an inquiry comprising the SRI 20 to a home location register 9. The HLR, possibly in conjunction with a visitor location register (VLR) (not shown), identifies the mobile station 15 which is the destination for the call. The HLR sends a message 30 back to SMSC 7, the message including an SRI acknowledgment 31 and the mobile identity 32. If the SMSC is equipped with anti-spam capability, it will examine whether the SRI is a spam message (for example, the calling address is inconsistent in SCCP and MAP levels, or destinations is adjacency). The SMSC then returns SRI acknowledgement 31 with SRI spam code and RA Correlation ID to the foreign network 3. The source SMSC 1 then sends a mobile terminated (MT) message 40 including the mobile termination (MT) 41 data and, in conformance with Applicants' invention, a call correlation identifier 42 derived from the SRI acknowledgement.

The home SMSC spam checking is performed at the SRI and MT message levels. The original SRI is checked for the legitimacy. For example, a bad SRI can consist of a fake calling party number and a true destination number. (This can be done, for example, in the following way. The foreign network switch copies the calling party number from earlier messages into the SRI message. The spammer sends spam messages using a fake calling party address through real SMSC: the calling SMSC address in MAP level is fake but at the SCCP level it is true. The spammer bypasses the SMSC and sends the spam message to an interworking switch in the foreign network; the spammer indicates that the sending network is from Spain but the interworking switch is in Korea. The country code in the calling party number will be different at MAP and SCCP level, and therefore the Anti-spam application can detect its inconsistency.) The bad SRI is detected in SMSC 7 which performs span) checking. If the SMSC 7 discovers that the SRI is bad, it substitutes the address of SMSC 7 for the address of the destination mobile terminal so that subsequent Mobile Terminated (MT) messages will terminate at the SMSC 7 and the spam message associated with the bad SRI, identified with an RA Correlation ID to identify the association with the previous SRI, will not be passed forward to the destination terminal 15.

If the SRI passes the spam tests performed in the SMSC 7, then the destination mobile terminal identifier is sent back to the source SMSC 1 along with an SRI acknowledgment containing a spam code and RA Correlation ID. If the spam code indicates SRI is a spam, the foreign network may or may not delete the MT message. If the foreign network does not delete the MT message, it then attempts to complete the call by sending a mobile terminated (MT) message including the mobile termination data and a RA Correlation ID back to SMSC 7. The SMSC can then correlate the MT message to the results of the SRI test so that it can reject any MT which follows the discovery that the SRI itself was tested and shown to represent a spam message. If the SRI has already tested as representing a spam message, the message is blocked. If the SRI did not indicate a spam message, then the message represented by the mobile termination message is examined to detect whether it is a spam message. If not, the message is passed on via destination mobile switching center 11 and a base station 13 to the destination terminal 15. SMSC 7 also can be arranged so that even if the correlated SRI is bad, it can still send a good MT to the destination terminal 15.

In FIG. 1 a short message service (SMS) message is transmitted from a source terminal (not shown) to a short message service center (SMSC) 1. Tis center is connected to a foreign network 3 which recognizes that the message is destined for network 4 which includes blocks 5, 7, 9, 11, 13 and 15. A request message, which is an SMS Send Route Info (SRI) 20 message is sent to an interworking mobile switching center 5 connected to the foreign network 3 and to a short message service center 7. In the configuration of FIG. 1, the anti-spam function is carried out within SMSC 7. The interworking MSC 5 sends an SRI message 30 to the SMSC 7. SMSC 7 sends the SRI message 30 to a home location register (HLR) 9 in order to locate the destination terminal. HLR 9 responds to SMSC 7 with an SRI message 40 which includes the routing address 41 of the mobile terminating station (MT). The SMSC then performs the spam check function based on spam check thresholds and criteria. The SMSC then sends SRI-Acknowledgment message 60 which includes a spam code 64 and RA Correlation ID 63, and the routing address of the terminating station 61 back to the interworking MSC. If a spam message has been detected, the identity of the SMSC is substituted for the identity of the terminating station so that the message can be intercepted when the foreign network 3 attempts to send the MT message to the destination terminal. Advantageously, this intercepts a large class of spam messages quickly and efficiently.

The interworking MSC forwards message 60 back to the foreign network 3 which then sends a MT (mobile terminated) message 70 including the routing address 71, the RA correlation ID 73, spam code 74, and the text of the message 75 to the interworking MSC. This is passed on to the SMSC which will block the message if the Correlation ID so indicates. If the RA Correlation ID does not indicate an associated SRI spam message, then the usual spam message checks are performed prior to transmitting the message to mobile terminal 15.

In an alternate configuration, illustrated in FIG. 2, an anti-spam server (ASA) performs the anti-spam checks. This server communicates with the SMSC and, if necessary or desirable, with the HLR to obtain the data for making anti-spam checks and to provide the results of the anti-spam checks to the SMSC.

In order to implement Applicants' invention, two new message segments are required—a spam code and an MT RA correlation ID to allow subsequent messages to be correlated with the SRI which was in the first message for setting up the connection.

The example of this description has been for short message service, at this time, the most serious spam problem. The same arrangement can be used for blocking or allowing call set-up for mobile telephone service, or land-line telephone service.

The above description is of one preferred embodiment of Applicants' invention. Other embodiments will be apparent to those of ordinary skill in the art without departing from the scope of the invention. The invention is limited only by the attached claims.

We claim:

1. In a telecommunications network interfacing with another telecommunications network, a method for identifying and blocking spam messages originated in the other network and destined for a terminal served by the telecommunications network, comprising the steps of:
   receiving a send routing information (SRI) message in said telecommunications network;
   responsive to receipt of said SRI message, deriving an SRI spam status code of said SRI message in said telecommunications network;
   returning said SRI spam status code and a correlation identifier to said another network in an SRI acknowledge message;
   storing said SRI spam status code;
   said another network returning a mobile termination (MT) message comprising said correlation identifier to said telecommunications network;
   in said telecommunications network, using said correlation identifier to find said SRI spam status code; and
   blocking transmission of messages for said MT message if said SRI spam status code indicates a spam message;
   wherein the step of blocking transmission comprises the step of substituting an address of a Short Message Service Center (SMSC) for an address of said destination terminal so that subsequent of the message are intercepted at the SMSC.

2. The method of claim 1 wherein the step of deriving said SRI spam status code comprises the step of deriving said SRI spam status code in a short message service center (SMSC) of said telecommunications network.

3. The method of claim 2 wherein the step of deriving said SRI spam status code comprises the steps of:
   accessing a home location register (HLR) using data of said SRI; and
   using data from said HLR to help derive said SRI spam status code.

4. The method of claim 1 further comprising the step of:
   in said another telecommunications network, responsive to receipt of said SRI spam status code, blocking further transmission of a message associated with said SRI.

5. In a telecommunications network interfacing with another telecommunications network, apparatus for identifying and blocking spam messages originated in the other network and destined for a terminal served by the telecommunications network, comprising:
   means for receiving a send routing information (SRI) message in said telecommunications network;
   means, responsive to receipt of said SRI message, for deriving an SRI spam status code of said SRI message in said telecommunications network;
   means for returning said SRI spam status code and a correlation identifier to said another network in an SRI acknowledge message;
   means for storing said SRI spam status code;
   in said another network, means for returning a mobile termination (MT) message comprising said correlation identifier to said telecommunications network;
   in said telecommunications network, means for using said correlation identifier to find said SRI spam status code; and
   means for blocking transmission of messages for said MT message if said SRI spam status code indicates a spam message;
   wherein said means for blocking comprises means for substituting an address of a Short Message Service Center (SMSC) for an address of said destination terminal so that subsequent parts of the message are intercepted at the SMSC.

6. The apparatus of claim 5 wherein the means for deriving said SRI spam status code comprises means for deriving said SRI spam status code in a short message service center (SMSC) of said telecommunications network.

7. The apparatus of claim 6 wherein the means for deriving said SRI spam status code comprises:
   means for accessing a home location register (HLR) using data of said SRI; and
   means for using data from said HLR to help derive said SRI spam status code.

8. The apparatus of claim 5 further comprising:
   in said another telecommunications network, means, responsive to receipt of said SRI spam status code, for blocking further transmission of a message associated with said SRI.

* * * * *